US012148561B2

(12) United States Patent
Jung et al.

(10) Patent No.: US 12,148,561 B2
(45) Date of Patent: Nov. 19, 2024

(54) COIL ELECTRONIC COMPONENT

(71) Applicant: SAMSUNG ELECTRO-MECHANICS CO., LTD., Suwon-si (KR)

(72) Inventors: Jung Hyuk Jung, Suwon-si (KR); Jong Min Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1009 days.

(21) Appl. No.: 16/566,282

(22) Filed: Sep. 10, 2019

(65) Prior Publication Data

US 2020/0168386 A1 May 28, 2020

(30) Foreign Application Priority Data

Nov. 27, 2018 (KR) ........................ 10-2018-0148506

(51) Int. Cl.
*H01F 5/00* (2006.01)
*H01F 27/255* (2006.01)
(Continued)

(52) U.S. Cl.
CPC ....... *H01F 27/2804* (2013.01); *H01F 27/255* (2013.01); *H01F 27/29* (2013.01);
(Continued)

(58) Field of Classification Search
CPC .................................................... H01F 27/2804
(Continued)

(56) References Cited

U.S. PATENT DOCUMENTS 6,362,713 B1 * 3/2002 Masuda ................ H01F 17/045 336/83
7,375,608 B2 * 5/2008 Suzuki ................ H01F 17/0013 336/200
(Continued)

FOREIGN PATENT DOCUMENTS

CN 104733154 A 6/2015
KR 10-2016-0019266 A 2/2016
(Continued)

OTHER PUBLICATIONS

Office Action issued in corresponding Korean Patent Application No. 10-2018-0148506 dated Feb. 14, 2023, with English translation.
(Continued)

*Primary Examiner* — Ronald Hinson
(74) *Attorney, Agent, or Firm* — MORGAN, LEWIS & BOCKIUS LLP

(57) ABSTRACT

A coil electronic component includes a body, a coil portion disposed in the body and including a support substrate and a coil pattern disposed on at least one surface of the support substrate and forming at least one turn, and first and second external electrodes disposed on external surfaces of the body and connected to both ends of the coil pattern, respectively. The first and second external electrodes include a first plating layer disposed on an end surface of the body and a conductive resin layer covering the first plating layer and extending to a main surface of the body, to be connected to the coil pattern. An aspect ratio of the coil pattern is less than 1 and a width W1 of the coil pattern satisfies $0.8W2 \leq W1 \leq W2$ as compared with a width W2 of the first and second external electrodes.

13 Claims, 4 Drawing Sheets

(51) Int. Cl.
*H01F 27/28* (2006.01)
*H01F 27/29* (2006.01)
*H01F 27/32* (2006.01)
*H01F 41/04* (2006.01)

(52) U.S. Cl.
CPC ......... *H01F 27/323* (2013.01); *H01F 41/042* (2013.01); *H01F 2027/2809* (2013.01)

(58) Field of Classification Search
USPC .......................................................... 336/200
See application file for complete search history.

(56) References Cited

U.S. PATENT DOCUMENTS

2008/0204183 A1* 8/2008 Loza .................. H01F 17/0013 336/200
2014/0184376 A1* 7/2014 Yoon .................. H01F 17/0006 336/200
2014/0184377 A1* 7/2014 Kim .................... H01F 17/0006 336/200
2015/0170823 A1 6/2015 Jeong et al.
2016/0042857 A1* 2/2016 Chun ...................... H01F 17/04 336/200
2017/0032885 A1* 2/2017 Lee ....................... H01F 41/046

FOREIGN PATENT DOCUMENTS

KR 10-2017-0015103 A 2/2017
KR 10-2018-0068149 A 6/2018

OTHER PUBLICATIONS

Office Action issued Nov. 14, 2023 for corresponding Chinese Patent Application No. 201911139588.8 (See English Translation).

* cited by examiner

COIL ELECTRONIC COMPONENT

CROSS-REFERENCE TO RELATED APPLICATION(S)

This application claims the benefit under 35 USC 119 (a) of Korean Patent Application No. 10-2018-0148506 filed on Nov. 27, 2018 in the Korean Intellectual Property Office, the entire disclosure of which is incorporated herein by reference for all purposes.

TECHNICAL FIELD

The present disclosure relates to a coil electronic component.

BACKGROUND

Inductors, coil electronic components, are representative passive elements forming electronic circuits together with resistors and capacitors to remove noise.

A thin film type inductor is manufactured by forming an inner coil portion by plating and then curing a magnetic metal powder-resin composite in which a magnetic metal powder and a resin are mixed to manufacture a body and forming an external electrode on an external surface of the body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a coil electronic component in which low profile characteristics are implemented by enlarging a line width of a coil as compared with a coil thickness, to prevent occurrence of a problem in which a step occurs due to a relatively large number of turns when a high aspect ratio (coil thickness/coil line width) of a coil pattern is implemented.

According to an aspect of the present disclosure, a coil electronic component includes a body, a coil portion disposed in the body, the coil portion including a support substrate and a coil pattern disposed on at least one surface of the support substrate and forming at least one turn, and first and second external electrodes disposed on external surfaces of the body and connected to both ends of the coil pattern, respectively. The first and second external electrodes include a first plating layer disposed on an end surface of the body and a conductive resin layer covering the first plating layer and extending to a main surface of the body, to be connected to the coil pattern. An aspect ratio of the coil pattern is less than 1 and a width W1 of the coil pattern satisfies a condition of $0.8W2 \leq W1 \leq W2$, as compared with a width W2 of the first and second external electrodes.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
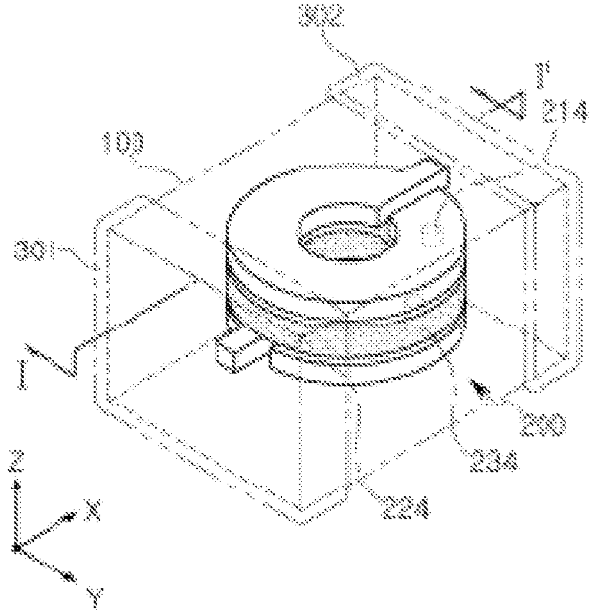
FIG. 1 is a schematic perspective view illustrating a coil portion of a coil electronic component according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein describes particular embodiments only, and the present disclosure is not limited thereby. As used herein, the singular forms “a,” “an,” and “the” are intended to include the plural forms as well, unless the context clearly indicates otherwise. It will be further understood that the terms “including”, “comprises,” and/or “comprising” when used in this specification, specify the presence of stated features, integers, steps, operations, members, elements, and/or groups thereof, but do not preclude the presence or addition of one or more other features, integers, steps, operations, members, elements, and/or groups thereof.

To clearly explain the present disclosure in the drawings, parts not related to the description are omitted, and to clearly illustrate the various layers and regions, the thickness is shown enlarged. In addition, the same reference numerals are used for the same components in the same technical scope.

Hereinafter, embodiments or examples of the present disclosure will be described in detail with reference to the accompanying drawings so that those skilled in the art may easily carry out the present disclosure.

Coil Electronic Component

Hereinafter, a coil electronic component according to an embodiment will be described with a thin film inductor as an example, but an embodiment thereof is not limited thereto.

FIG. 1 is a schematic perspective view illustrating a coil portion of a coil electronic component according to an embodiment.

Referring to FIG. 1, a thin film inductor used for a power supply line of a power supply circuit is illustrated as an example of a coil electronic component.

Figure 2:
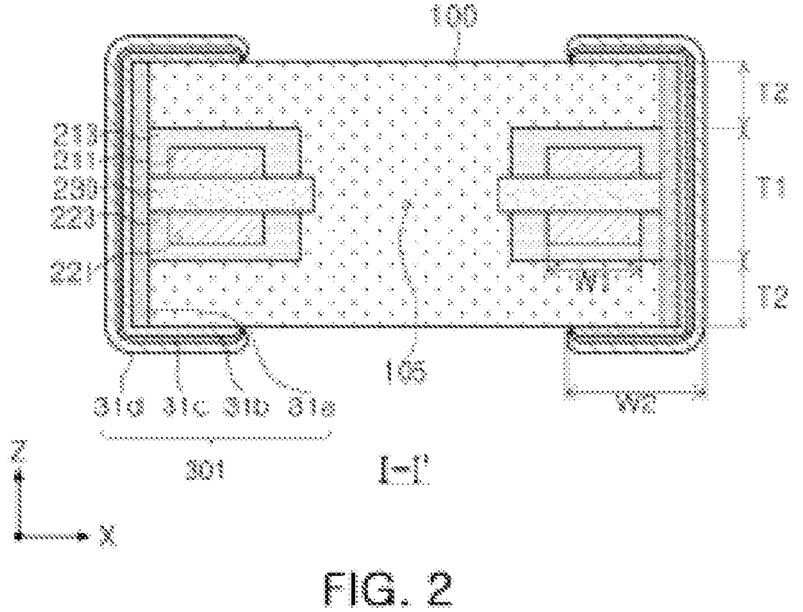
FIG. 2 is a sectional view taken along line I-I' in FIG. 1.

FIG. 2 is a sectional view taken along line I-I' in FIG. 1.

A coil electronic component according to an embodiment includes a body 100, a coil portion 200 embedded in the body 100, and first and second external electrodes 301 and 302 disposed on external surfaces of the body 100 to be connected to coil patterns 211, 221, 212 and 222.

In the coil electronic component according to an embodiment, the 'length' direction is defined as the 'X' direction in FIG. 1, the 'width' direction as the 'Y' direction and the 'thickness' direction as the 'Z' direction.

A material of the body 100 is not particularly limited as long as it exhibits magnetic characteristics while forming the appearance of a thin film inductor, and for example, the body 100 may include a metal magnetic powder.

For example, the body 100 may be formed as ferrite or a magnetic metal powder is filled in the resin. In this case, the ferrite may be a material such as Mn—Zn ferrite, Ni—Zn ferrite, Ni—Zn—Cu ferrite, Mn—Mg ferrite, Ba ferrite, Li ferrite or the like. The magnetic metal powder may include one or more selected from the group consisting of iron (Fe), silicon (Si), chromium (Cr), aluminum (Al) and nickel (Ni), and for example, may be an Fe—Si—B—Cr amorphous metal, but an example thereof is not limited thereto. A diameter of the magnetic metal powder particle may be about 0.1 μm to 30 μm. The body 100 may be formed in the form in which the ferrite or the magnetic metal powder is dispersed in a thermosetting resin such as an epoxy resin or a polyimide resin. A thickness T of the body 100 may be changed depending on an electronic device to be used, and may be approximately 500 μm to 900 μm, but is not limited thereto.

A coil portion including coil patterns 211, 221, 212 and 222 forming at least one turn is formed on one surface of a support substrate 230 disposed inside the body 100, and a coil portion including coil patterns 211, 221, 212 and 222 forming at least one turn is formed on the other surface opposing the one surface of the support substrate. A plurality of coil layers 211, 212, 221 and 222 stacked on both surfaces of the support substrate 230, respectively, are electrically connected through vias 214, 224 and 234 penetrating through the support substrate 230. Insulating layers 213, 215, 223 and 225 are disposed on both surfaces of the support substrate 230, between the coil patterns 211, 212, 221 and 222, respectively, and cover the coil patterns 211, 212, 221 and 222, respectively.

The coil patterns 211, 221, 212 and 222 may be formed by electroplating.

An aspect ratio AR, for example, ratios h1/W1 and h2/W2 of thicknesses h1 to widths W1 of the coil patterns 211, 221, 212 and 222, is less than 1, respectively. The coil patterns 211, 221, 212 and 222 of first and second coil layers of the coil component according to an example have similar aspect ratios. For example, the aspect ratio of the coil pattern may be less than 1, and in detail, the aspect ratio may be in a range from 0.3 to 0.5, inclusive.

On the other hand, the direct current (DC) resistance ($R_{dc}$) characteristic, which is one of the main characteristics of a coil component, for example, an inductor, is reduced as a cross-sectional area of the coil portion increases. Further, the inductance increases as the area of a magnetic region in the body through which the magnetic flux passes is increased. Therefore, to improve the inductance while lowering the direct current resistance ($R_{dc}$), it is necessary to increase the area of the magnetic region while increasing the cross-sectional area of the coil portion. To increase the cross-sectional area of the coil portion, there is a method of increasing the width of the coil pattern and a method of increasing the thickness of the coil pattern. However, if the width of the coil pattern is simply increased, a short between the coil patterns may occur. Further, there is a limit in the number of turns of the coil pattern that may be implemented, leading to reduction in the area occupied by the magnetic region, resulting in lowered efficiency and limitations in implementation of a high-capacity product. To reduce this limitation, it has been required to increase the thickness of the coil pattern without increasing the width of the coil pattern to implement a coil pattern having a high aspect ratio (coil thickness/coil line width). However, when a relatively high aspect ratio of the coil pattern is implemented, the number of turns is increased, causing a problem in which a step occurs. Therefore, as in the coil electronic component according to an example of the present disclosure, when the aspect ratio of the coil patterns 211, 221, 212 and 222 is less than 1, the height and width of the coil pattern may be freely adjusted within an allowable range of the coil pattern forming process technique. Therefore, the uniformity of the pattern is excellent, the cross-sectional area may be increased, and low direct current resistance ($R_{dc}$) characteristics may be implemented according to an embodiment of the present disclosure.

Figure 7:
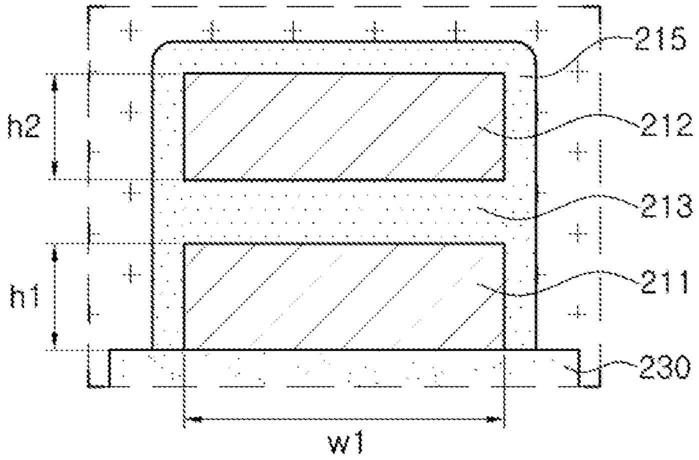
FIG. 7 is a cross-sectional view of a coil portion according to an embodiment of the present disclosure.

FIG. 7 is a cross-sectional view of a coil portion according to an embodiment.

As described above, the coil patterns 211, 221, 212 and 222 have an aspect ratio (AR) of less than 1, the aspect ratio being a ratio h1/W1, h2/W1 of a thickness h1 or h2 to a width W1 of the coil patterns 211, 221, 212 and 222. In this case, the coil pattern may have the number of one or more turns and may also have a single turn number. In this case, a single turn number indicates that the number of turns is 1 or less, and since the number of turns is smaller than that in the case in which the aspect ratio is 1 or more, a step width may be reduced by increasing a coil width. In this case, even when the number of turns is relatively small, since the width W2 of an electrode is 80 to 100% of the width W1 of the coil pattern, the area overlapping a lower electrode is increased compared with the case in which the aspect ratio is 1 or more, such that the inductance may be implemented. A low profile, a so-called low profile inductor is provided by improving scattering of plating compared to the related art coil having an aspect ratio of 1 or more.

Figure 3:
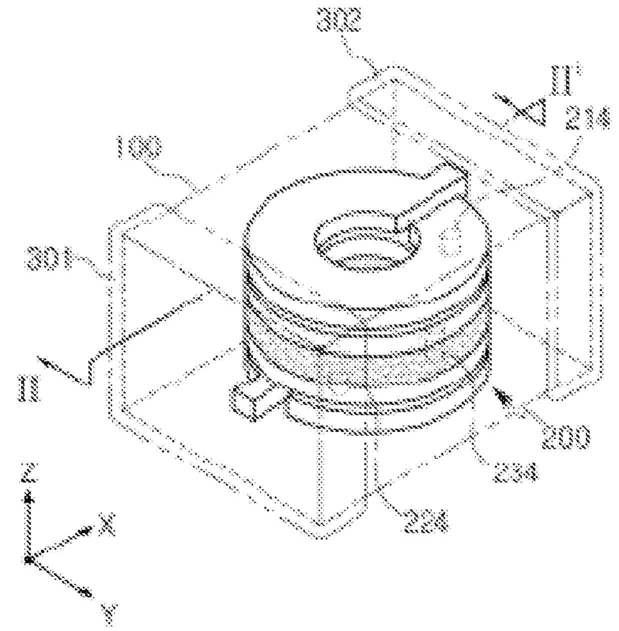
FIG. 3 is a schematic perspective view illustrating a coil portion of a coil electronic component according to another embodiment of the present disclosure.

FIG. 3 is a schematic perspective view illustrating a coil portion of a coil electronic component according to another embodiment.

Figure 4:
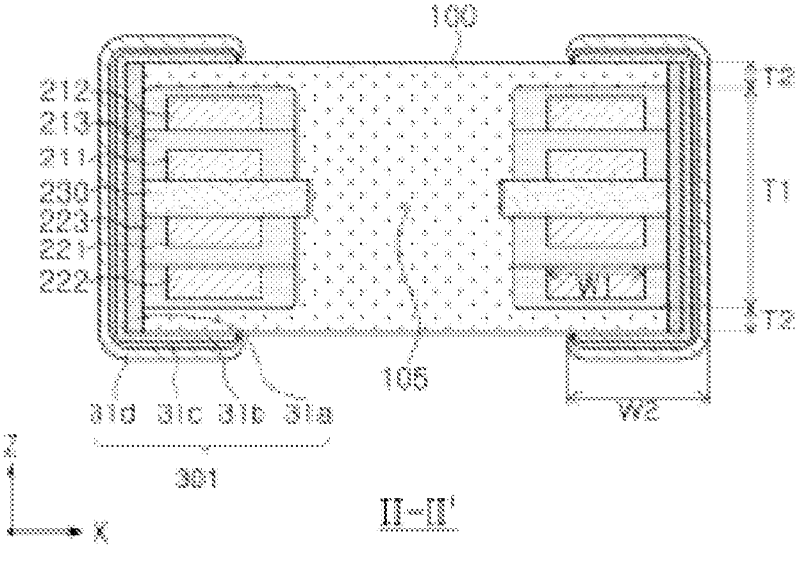
FIG. 4 is a sectional view taken along line II-II' of FIG. 3.

FIG. 4 is a sectional view taken along line II-II' of FIG. 3.

Figure 5:
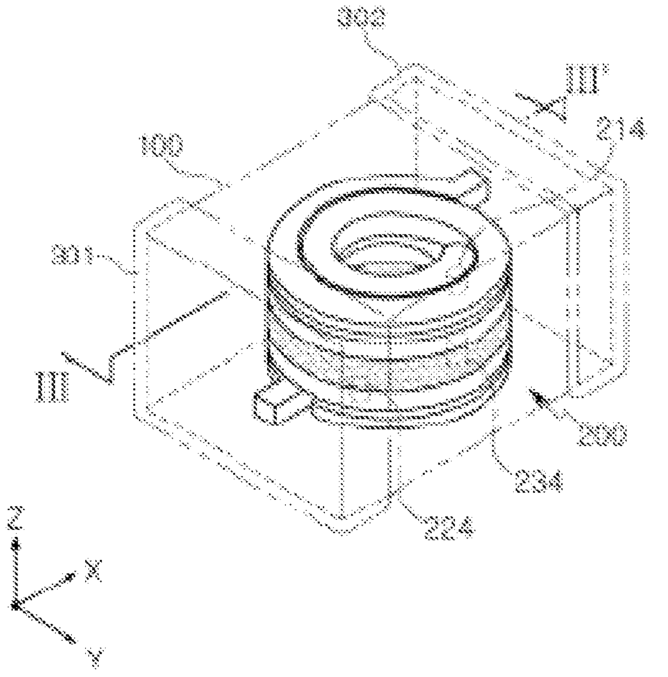
FIG. 5 is a schematic perspective view illustrating a coil portion of a coil electronic component according to another embodiment of the present disclosure.

FIG. 5 is a schematic perspective view illustrating a coil portion of a coil electronic component according to another embodiment.

Figure 6:
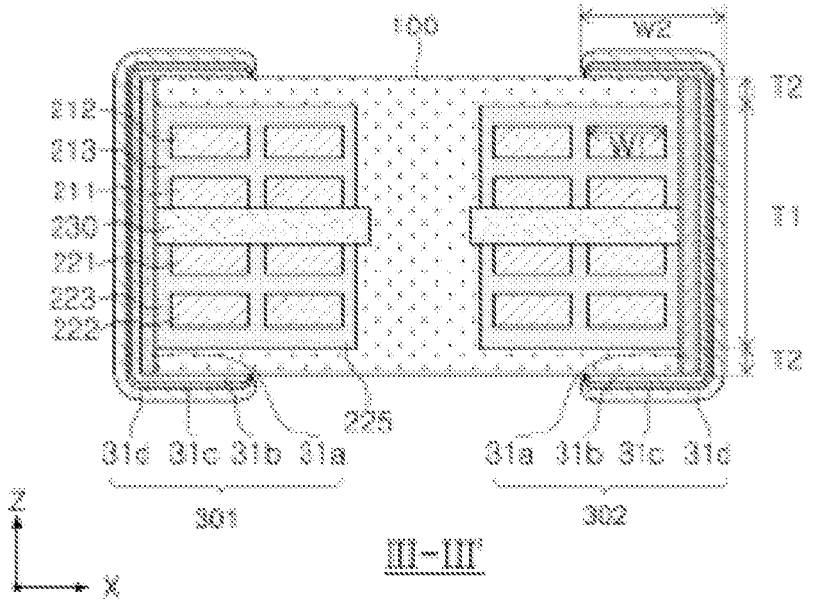
FIG. 6 is a cross-sectional view taken along line of FIG. 5.

FIG. 6 is a cross-sectional view taken along line III-III' of FIG. 5.

Although only first coil layers 211 and 221 and second coil layers 212 and 222 are illustrated in the drawings, coil layers may be further formed on the second coil layers 212 and 222 and may also be electrically connected to each other as an insulating layer having a via formed therein is disposed therebetween. In this case, the descriptions of the first coil layers 211 and 221 or the second coil layers 212 and 222 may be applied to the additional coil layer. In addition, a coil layer may be further formed between the first coil layers 211 and 221 and the second coil layers 212 and 222, and may also be electrically connected to each other as an insulating layer having a via formed therein is located therebetween. In this case, the descriptions of the first coil layers 211 and 222 or the second coil layers 212 and 222 may be applied to the additional coil layer. For example, the reduction in the capacity due to reduction in the number of turns may be compensated by securing an additional capacity by configuring a plurality of layers.

A material or the type of the support substrate 230 is not particularly limited as long as it may support a plurality of coil layers 211, 212, 221 and 222. Examples of the support substrate 230 include a copper clad laminate (CCL), a polypropylene glycol (PPG) substrate, a ferrite substrate, a metal-based soft magnetic substrate, or the like. The support substrate 230 may also be an insulating substrate formed of an insulating resin. As the insulating resin, a thermosetting resin such as an epoxy resin, a thermoplastic resin such as polyimide, or a resin in which these resins are impregnated with a reinforcing material such as an inorganic filler or a glass fiber, for example, for example, a prepreg resin, Ajinomoto Build-up Film (ABF) resin, FR-4 resin, bismaleimide triazine (BT) resin, and a Photo Imageable Dielectric (PID) resin may be used. For example, the ABF layer is added in the middle of the support substrate 230, so that the stiffness of the coil portion may be enhanced compared to that in a structure of the related art coil. In terms of stiffness maintenance, an insulating substrate including a glass fiber and an epoxy resin may be used, but an embodiment thereof is not limited thereto. A thickness T of the support substrate 230 may be 80 μm or less, in detail, 60 μm or less, and in more detail, 40 μm or less, but an embodiment thereof is not limited thereto.

A through-hole 105 is formed to penetrate through a central portion of the support substrate 230. The through-hole 105 is filled with a magnetic material to form a core portion. Inductance Ls may be improved by forming the core portion filled with the magnetic material.

The coil patterns 211, 221, 212 and 222 may be formed to have a spiral shape, and the coil patterns 211, 221, 212 and 222 formed on one surface and the other surface of the support substrate 230 are electrically connected to each other, through vias 214, 224 and 234 formed by penetrating through the support substrate 230.

The coil patterns 211, 221, 212 and 222 and the vias 214, 224 and 234 may be formed to include a metal having excellent electrical conductivity, and for example, may be formed of silver (Ag), palladium (Pd), aluminum (Al), nickel (Ni), titanium (Ti), gold (Au), copper (Cu), platinum (Pt), or alloys thereof. One ends of the coil patterns 211, 221, 212 and 222 formed on one surface of the support substrate 230 are exposed to one end surface of the body 100 in the length X direction, and one ends of the coil patterns 211, 221, 212 and 222 formed on the other surface of the support substrate 230 are exposed to the other end surface of the body 100 in the length X direction.

In this case, embodiments thereof are not limited thereto. For example, one end of each of the coil patterns 211, 221, 212 and 222 may be exposed to at least one surface of the body 100.

The first and second external electrodes 301 and 302 are formed on external surfaces of the body 100 to be connected to the coil patterns 211, 221, 212 and 222 exposed to end surfaces of the body 100, respectively.

The first and second external electrodes 301 and 302 may be formed to include a metal having excellent electrical conductivity. For example, the first and second external electrodes 301 and 302 may be formed of Ni, Cu, Sn, or Ag, alone or in combinations thereof.

The external electrodes 301 and 302 may extend to both surfaces in a thickness direction of the body 100 and/or both sides of the body 100 in a width direction. The external electrodes 301 and 302 may be formed on a lower surface of the body 100 and extend to both surfaces of the body 100 in a length direction. For example, the arrangement shape of the external electrodes 301 and 302 is not particularly limited and may be disposed in various shapes.

Referring to FIGS. 2, 4 and 6, the external electrodes 301 and 302 include a first plating layer **31*a* disposed on end surfaces of the body 100 and a conductive resin layer 31*b* that covers the first plating layer 31*a* and extends to main surfaces of the body 100, to be connected to the coil patterns 211, 221, 212 and 222. The first plating layer 31*a* is disposed on the end surface of the body 100 and does not extend to a main surface of the body 100. In detail, the first plating layer 31*a* is only disposed on the end surface of the body 100, and only the conductive resin layer 31*b* and second plating layers 31*c* and 31*d* are formed on the main surfaces of the body 100, to be described later. The first plating layer 31*a*** may be formed of one or more selected from the group consisting of copper and nickel, but an embodiment thereof is not limited thereto.

According to an embodiment, the conductive resin layer **31*b* covering the first plating layer 31*a* and extending to the main surface of the body 100 is included. Since the conductive resin layer 31*b* covers the first plating layer 31*a* and extends to the main surface of the body 100, the body 100 has a form in which the first plating layer 31*a* is disposed on a surface of the body 100 in the length direction, the conductive resin layer 31*b* is disposed thereon, only the conductive resin layer 31*b* is disposed on the main surface of the body 100, and the first plating layer 31*a*** is not formed on the main surface.

The conductive resin layer **31*b*** may include one or more selected from the group consisting of copper (Cu) and nickel (Ni), and a thermosetting resin. The thermosetting resin may be a polymer resin such as an epoxy resin, a polyimide or the like, but is not limited thereto.

According to an embodiment, the second plating layers **31*c* and 31*d* may be further disposed on the conductive resin layer 31*b*. Although the second plating layers 31*c* and 31*d* are not particularly limited, a nickel (Ni) layer 31*c* and a tin (Sn) layer 31*d*** may be sequentially disposed as the second plating layers.

For example, when an area covering the coil portion in the body is referred to as a cover portion, the cover portion may have a thickness T1 smaller than a thickness T2 of the coil portion, for example, T2≥2T1, and in detail, a thickness of each of upper and lower cover portions may be 100 μm, and a thickness of the coil portion may be 450 μm.

As set forth above, according to an embodiment, low profile characteristics may be implemented by enlarging a line width of a coil pattern to prevent a problem in which a step occurs.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

The expression, an example, used in this inventive concept does not mean the same embodiment, but is provided for emphasizing and explaining different unique features. However, the above-mentioned examples do not exclude being implemented in combination with the features of other examples. For example, although the description in the specific example is not described in another example, it may be understood as an explanation related to another example, unless otherwise described or contradicted by the other example.

The terms used in this inventive concept are only used to illustrate an example and are not intended to limit the present inventive concept. The singular expressions include plural expressions unless the context clearly dictates otherwise.

What is claimed is:

1. A coil electronic component comprising:

a body;

a coil portion disposed in the body, the coil portion including a support substrate and a coil pattern comprising a plurality of layers disposed on at least one surface of the support substrate, wherein each of the plurality of layers comprises a plurality of turns around a winding axis and having an aspect ratio of less than 1, wherein the winding axis is substantially perpendicular to the support substrate; and first and second external electrodes disposed on end surfaces of the body substantially perpendicular to the support substrate and extending to at least a main surface of the body substantially parallel to the support substrate, and connected to both ends of the coil pattern, respectively, wherein the first and second external electrodes include a first plating layer disposed on the end surfaces of the body and a conductive resin layer covering the first plating layer, wherein a portion of the first and second external electrodes including the conductive resin extends to the main surface of the body, to be connected to the coil pattern, and wherein an aspect ratio of the coil pattern is less than 1 and a width W1 of the coil pattern satisfies a condition of $0.8W2 \leq W1 \leq W2$ as compared with a width W2 of the portion of the first and second external electrodes along the main surface of the body.

2. The coil electronic component of claim 1, wherein the coil pattern has an aspect ratio in a range from 0.3 to 0.5, inclusive.

3. The coil electronic component of claim 1, wherein the conductive resin layer comprises one or more selected from the group consisting of copper and nickel, and a thermosetting resin.

4. The coil electronic component of claim 1, wherein the first plating layer is formed of one or more selected from the group consisting of copper and nickel.

5. The coil electronic component of claim 1, wherein the conductive resin layer is provided with a second plating layer further disposed thereon.

6. The coil electronic component of claim 5, wherein the second plating layer has a form in which a nickel (Ni) layer and a tin (Sn) layer are sequentially disposed.

7. The coil electronic component of claim 1, wherein, when a region covering the coil portion in the body is referred to as a cover portion, the cover portion has a thickness less than a thickness of the coil portion.

8. The coil electronic component of claim 7, wherein the thickness of the coil portion is twice or more the thickness of the cover portion.

9. A coil electronic component, comprising:

a coil portion disposed in a body, the coil portion comprising a support member extending in a length-width plane in the body, and a coil pattern comprising a plurality of layers disposed on a surface of the support member, each of the plurality of layers of the coil pattern comprising a plurality of turns around a winding axis extending in a thickness direction and having a thickness-to-width (aspect) ratio of less than one;

first and second external electrodes disposed respectively on first and second end surfaces extending in the thickness direction of the body and connected to corresponding ends of the coil pattern, wherein each of the first and second external electrodes comprises a portion extending on a mounting surface of the body and spaced apart from each other in a length direction, and wherein a width W1 of the coil pattern satisfies a condition of $0.8W2 \leq W1 \leq W2$, W2 being a width of the portions of the first and second external electrodes disposed on the mounting surface and extending in the length direction substantially perpendicular to the winding axis.

10. The coil electronic component of claim 9, wherein the first and second electrodes comprise a first plating layer disposed on the corresponding end surfaces and a conductive resin layer disposed on the mounting surface and connected to a corresponding first plating layer.

11. The coil electronic component of claim 9, wherein the coil pattern comprises a conductive layer having at least one coil turn and an insulating layer disposed on the conductive layer.

12. The coil electronic component of claim 9, wherein a thickness of a portion of the body extending between a topmost surface of the coil pattern and the mounting surface is less than a thickness of the coil pattern.

13. The coil electronic component of claim 9, wherein the aspect ratio of the coil pattern is in a range from 0.3 to 0.5, inclusive.

* * * * *